R. WILDAY.
APPARATUS FOR MAKING RUBBER STAMPS.
APPLICATION FILED NOV. 13, 1915.
1,226,289.
Patented May 15, 1917.
3 SHEETS—SHEET 2.
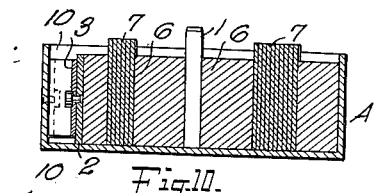
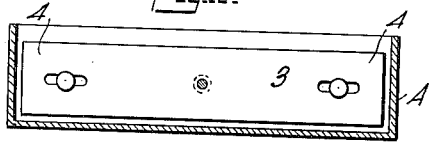
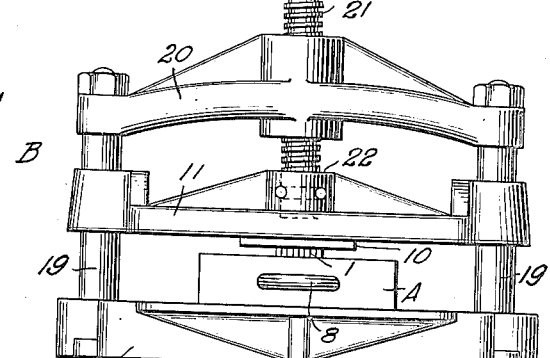
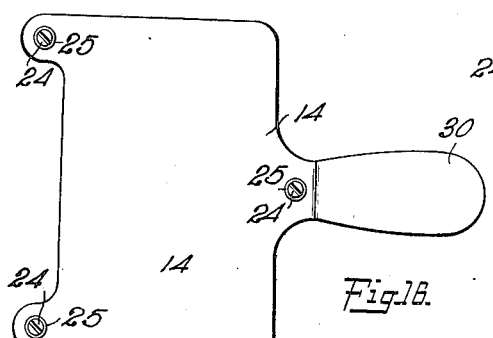
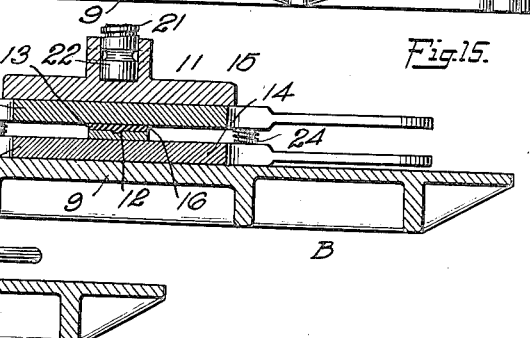
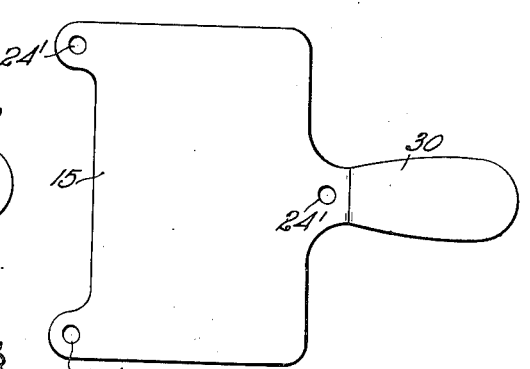
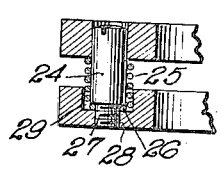
WITNESSES
INVENTOR
Robert Wilday
BY
ATTORNEYS

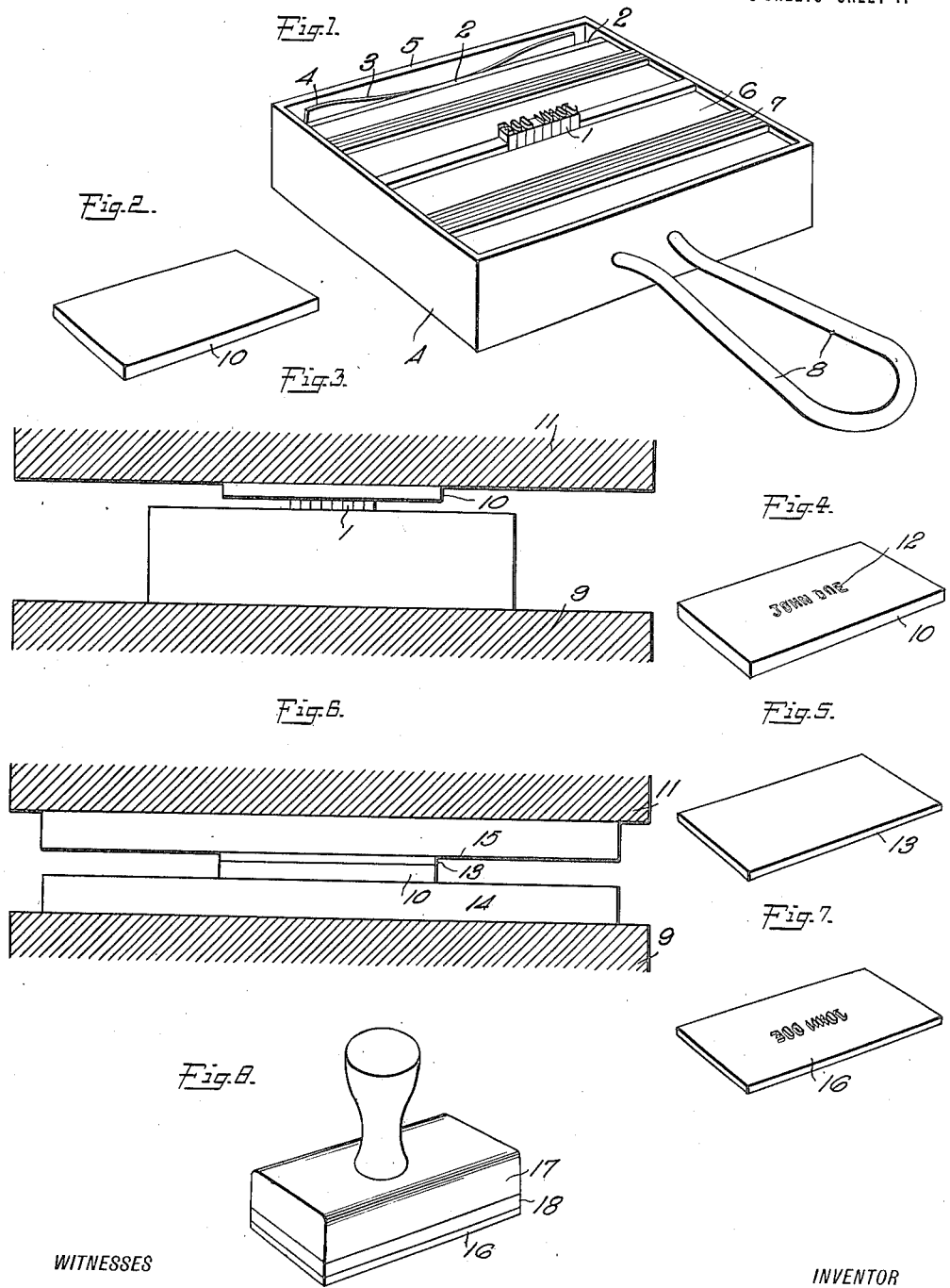

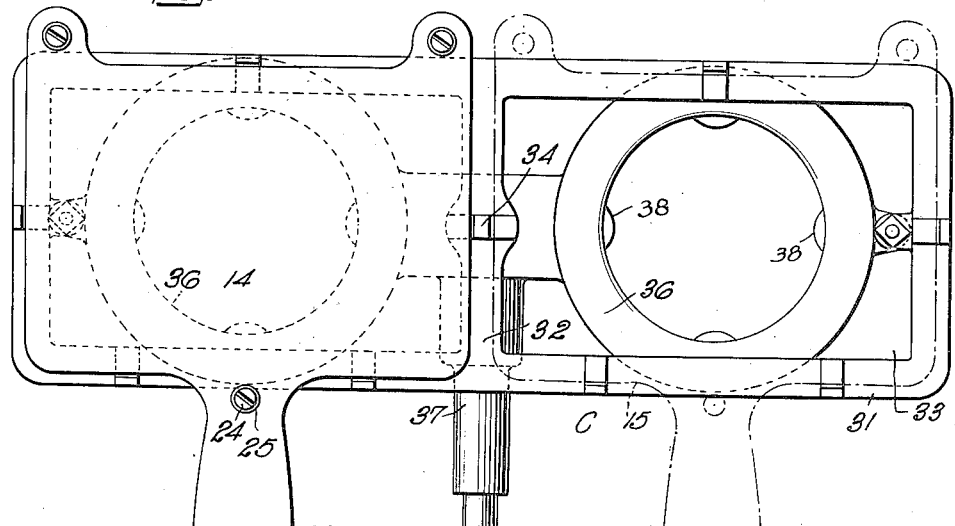
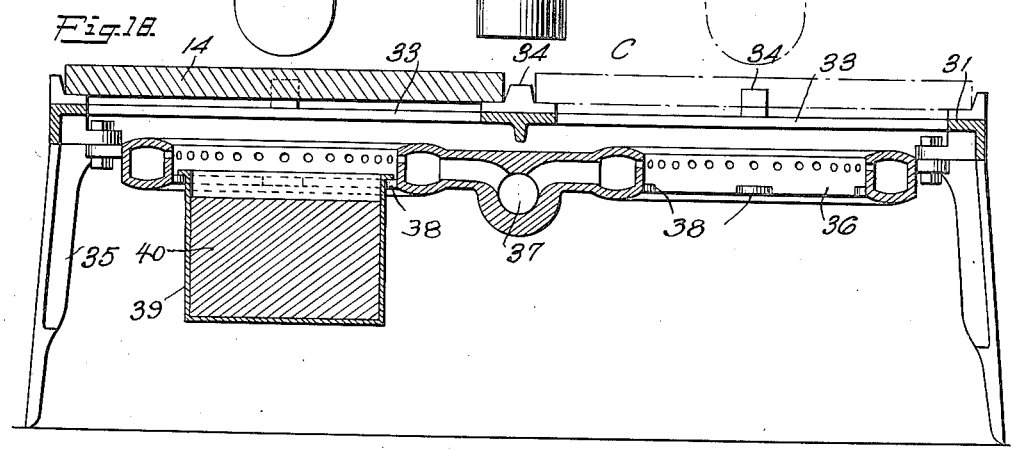

UNITED STATES PATENT OFFICE.

ROBERT WILDAY, OF NEW YORK, N. Y.

APPARATUS FOR MAKING RUBBER STAMPS.

1,226,289.   Specification of Letters Patent.   Patented May 15, 1917.

Application filed November 13, 1915. Serial No. 61,308.

*To all whom it may concern:*

Be it known that I, ROBERT WILDAY, a citizen of the United States, and a resident of the city of New York, Woodhaven, borough of Queens, in the county of Queens and State of New York, have invented a new and Improved Apparatus for Making Rubber Stamps, of which the following is a full, clear, and exact description.

This invention relates to the making of rubber stamps, and has for its principal objects to improve the process of and means for producing rubber stamps whereby the operation can be carried on expeditiously, economically and effectively.

According to the usual method of making rubber stamps the impression of the type composition is made in a plastic material which requires about two hours to dry or harden so as to form a mold by which the rubber type or stamp is made.

The specific object of the present invention is to materially shorten the time required to make the stamp by doing away with plastic impression material and using an impression material which is dry and in the form of a board in which the intaglio impression from the lead type composition is directly made with sharp, clear lines and edges. This impression material being already dry, the strip of rubber which is to have the rubber stamp type impressed thereon is placed directly on the impression board or mold, and by the two being placed between hot plates and subjected to the required pressure, the rubber will receive the type form and become vulcanized.

A further object of the invention is the provision of improved mechanical means for carrying out the process in a simple and expeditious manner, it requiring only about ten minutes to make a complete rubber stamp, as compared with a period of two to three hours required by the old method.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a perspective view of the chase or holder for a type composition by which the impression mold is made;

Fig. 2 is a perspective view of the impression board before it receives the type impression;

Fig. 3 is a view showing the operation of producing the type impression in the impression board or mold;

Fig. 4 is a perspective view of the mold or impression board with the type impression therein;

Fig. 5 is a perspective view of the rubber strip on which rubber type is to be molded by the mold;

Fig. 6 is a view showing the rubber strip and mold held compressed between hot plates;

Fig. 7 is a perspective view of the rubber piece with the type molded thereon;

Fig. 8 is a perspective view of a completed hand stamp;

Fig. 9 is a sectional view of the chase or type holder taken transversely to the line of type;

Fig. 10 is a detail sectional view;

Fig. 11 is a side view of the press used in the process of making the mold and the stamp, this figure illustrating the process of making the mold;

Fig. 12 is a vertical section of the press;

Figs. 13 and 14 are plan views of the vulcanizing plates;

Fig. 15 is a sectional view showing the vulcanizing plates in the press and in the act of vulcanizing the rubber stamp;

Fig. 16 is a detail sectional view;

Fig. 17 is a plan view of the vulcanizing plate heater showing one plate in position; and Fig. 18 is a longitudinal section of the heater.

In carrying out the process the first step is the setting up of the required composition in lead type 1 which is set and clamped in a chase or holder A. This holder comprises a rectangular metal box of suitable design, and in the same is a follower plate 2 backed by a bowed spring 3 which is fastened to the follower plate and has its free ends 4 loosely fastened to the wall 5 of the chase or holder A. Filler blocks and strips 6 and 7 are used in connection with the follower plate 2 and type 1 so that the latter can be firmly clamped, the clamping being done by means of the spring 3. To facilitate the handling of the chase the box is provided with a handle 8. After the composition has been set up and clamped the chase is placed on the bottom plate 9 of a press and then a strip of impression board 10 is placed on top of the type, as shown in Fig. 3, so that the presser plate 11 of the press can apply pressure to the board 10 so as to force the face of the type 1 into the board for making the same into a mold by producing an impression 12 of the type, as shown in Fig. 4. This mold is made of a suitable material which is dry and is capable of receiving a sharp and clear impression from the type, and since it is dry it can be immediately used for making the rubber stamp. Papier-mâché, fiber board, or dry plastic composition on a paper backing may serve to receive the type impression. A strip of soft rubber 13, Fig. 5, of suitable size to form the face of the stamp, is placed on top of the mold, as shown in Fig. 6, and these two are inserted between vulcanizing plates 14 and 15 which are subjected to pressure toward each other by the parts 9 and 11 of the press, whereby the rubber is forced into the type impression 12 of the mold and so held while the heat of the plates 14 and 15 vulcanizes the rubber. The rubber stamp 16 shown in Fig. 7 is thereby produced. After the stamp is made it is mounted on a suitable backing 17 which may have a cushion 18. The whole operation of making the rubber printing die can be performed in about ten minutes.

The press B shown in Figs. 11 and 12 is of the usual form and comprises the base plate 9, presser plate 11, guide standards 19 fastened to the base plate and guiding the movement of the presser plate 11, yoke or cross head 20 fastened to the upper ends of the standards, and the operating screw 21 which has a swiveled connection at 22 with the presser plate and the handwheel 23.

In Figs. 11 and 12 the press is shown in use for making the mold in the impression board 10, while in Fig. 15 the press is shown in use for vulcanizing the rubber stamp 16, this being accomplished by a pair of vulcanizing plates 14 and 15 which are made of metal. The plate 14 has a plurality of studs 24 which are adapted to engage in openings 24' in the plate 15 so that the two plates will register. Surrounding the studs are helical compression springs 25 each of which has its lower ends 26 engaged under an annular shoulder 27 adjacent the bottom of the stud which the spring surrounds. The lower end of the stud screws into a threaded opening 28, and the lower end of the spring sets into a socket 29 in the plate 14. The springs 25 are normally of such length or axial dimensions that, when the plate 25 rests on the springs with the studs engaged in the openings 24', the plate 15 will be supported above the plate 14 at such a height that it will not contact with the top face of the rubber strip 13 which is to form the stamp. This makes it easy to keep the rubber strip and mold in register while being placed in position in the press and between the hot vulcanizing plates. After the vulcanizing plates with the rubber and mold interposed are in the press, the screw 21 of the press is operated so as to force the hot plates together, whereby the rubber is forced into the type impression of the mold and is so held for a short interval so as to vulcanize the rubber. When the pressure is applied, the springs 25 yield so that the plate 15 can be forced toward the plate 14. To facilitate the handling of the vulcanizing plates the same have handles 30 which are adapted to overlie each other.

The vulcanizing plates must be hot, and for this purpose a heater C, Figs. 17 and 18, is employed. This heater comprises a top frame 31 which has at opposite sides of its center bar 32 a rectangular opening 33, and over each opening is positioned a vulcanizing plate. On the frame 31 and center bar 32 are upstanding lugs 34 for insuring the proper positioning of the vulcanizing plates which are adapted to rest on the top of the frame. This frame 31 is supported on legs or equivalent members 35, and disposed directly under the openings 33 of the frame are gas burners 36 connected with a gas mixture supply pipe 37 which is adapted to be connected with a source of fuel supply. According to this method it is only necessary to heat the vulcanizing plates and not to heat the entire press, as is commonly necessary.

The heater C is so designed that it can be used where gas is not available for the burners 36. Each burner is provided with internal lugs 38 by which a can 39 of solidified alcohol 40 can be supported in the burner, as shown at the left of Fig. 18. This solidified alcohol is lighted and the flame rises through the gas burner and heats the vulcanizing plate above it. Thus the heater is capable of much wider service.

Having thus described my invention, I claim as new and desire to secure by Letters Patent:

1. An apparatus for making rubber stamps, comprising a press with vulcanizing plates disposed therein and adapted to receive a mold and rubber piece between them, one plate having studs and the other apertures to engage the studs, and yielding means on the studs to normally hold the plates normally spaced apart a distance greater than the thickness of the mold and rubber piece, said plates having handles and the plates being arranged to register, with the handles thereof registering to permit the plates to be simultaneously inserted in or removed from the press.

2. A vulcanizing device for rubber stamps including a pair of plates, one plate having a plurality of studs extending from one face and the other apertures to engage the studs, and springs surrounding the studs and fastened in position thereby, said springs being shorter than the studs, whereby the latter can enter the openings of the companion plate and rest on the springs, whereby the latter hold the plates separated a sufficient distance to permit a mold and piece of rubber to be freely inserted between the plates, said plates having handles and the plates being arranged to register, with the handles thereof registering to permit the plates to be simultaneously inserted in or removed from the press.

3. In a rubber stamp-making apparatus, a pair of vulcanizing plates, one plate having apertures and the other studs engaged within the apertures for registering the plates, and helical springs shorter than and encircling the studs and secured in place by the studs, said plates having handles and the plates being arranged to register, with the handles thereof registering to permit the plates to be simultaneously inserted in or removed from the press.

4. In an apparatus for making rubber stamps, a pair of vulcanizing plates and a heater therefor, said heater comprising a frame having two series of lugs for engaging the edges of the vulcanizing plates to hold them in proper position, burners carried by the frame and so disposed with respect to the lugs as to lie directly under the vulcanizing plates when the latter are positioned on the frame, and internal lugs in the burners.

In testimony whereof I have signed my name to this specification in the presence of two subscribing witnesses.

ROBERT WILDAY.

Witnesses:
C. BRADWAY,
PHILIP D. ROLLHAUS.